United States Patent

Csermak et al.

[11] Patent Number: 5,217,309
[45] Date of Patent: Jun. 8, 1993

[54] DRIVE DEVICE, ESPECIALLY FOR WIPERS OF MOTOR VEHICLES

[75] Inventors: Martin Csermak; Bernd Walther, both of Bietigheim-Bissingen, Fed. Rep. of Germany

[73] Assignee: SWF Auto-Electric GmbH, Bietigheim Bissingen, Fed. Rep. of Germany

[21] Appl. No.: 856,205

[22] PCT Filed: Sep. 10, 1991

[86] PCT No.: PCT/EP91/01715
§ 371 Date: May 12, 1992
§ 102(e) Date: May 12, 1992

[87] PCT Pub. No.: WO92/04563
PCT Pub. Date: Mar. 19, 1992

[30] Foreign Application Priority Data

Sep. 12, 1990 [DE] Fed. Rep. of Germany ....... 4028892

[51] Int. Cl.[5] .............................................. F16C 33/74
[52] U.S. Cl. ..................................... 384/130; 384/151
[58] Field of Search .............. 384/130, 138, 139, 151, 384/153, 222, 296

[56] References Cited

U.S. PATENT DOCUMENTS

| 3,241,892 | 3/1966 | Oishei | 384/222 |
| 3,845,998 | 11/1974 | McElhinney et al. | 384/138 |
| 4,660,996 | 4/1987 | Marshall | 384/138 |
| 4,750,878 | 6/1988 | Nix et al. | 384/296 |
| 4,806,024 | 2/1989 | Tanaka et al. | 384/296 X |

FOREIGN PATENT DOCUMENTS

| 1118341 | 11/1961 | Fed. Rep. of Germany. |
| 8815533 | 3/1989 | Fed. Rep. of Germany. |
| 3914231 | 10/1990 | Fed. Rep. of Germany. |

Primary Examiner—Thomas R. Hannon
Attorney, Agent, or Firm—Robert P. Seitter; J. Gordon Lewis

[57] ABSTRACT

A drive device for wipers of motor vehicles includes a shaft extending a front face of a bearing housing and with a cylindrical slide bearing which is inserted into the bearing housing at little distance from the front face of said bearing housing, and with a ring groove limited by the slide bearing, the bearing housing and the shaft. A bush firmly fixed to the bearing housing and made of elastic material closes the ring groove in front of the slide bearing and at its end turned off from the bearing housing comprises a sealing flange radially projecting towards the inside, which sealing flange engages into a ring groove of the shaft.

12 Claims, 1 Drawing Sheet

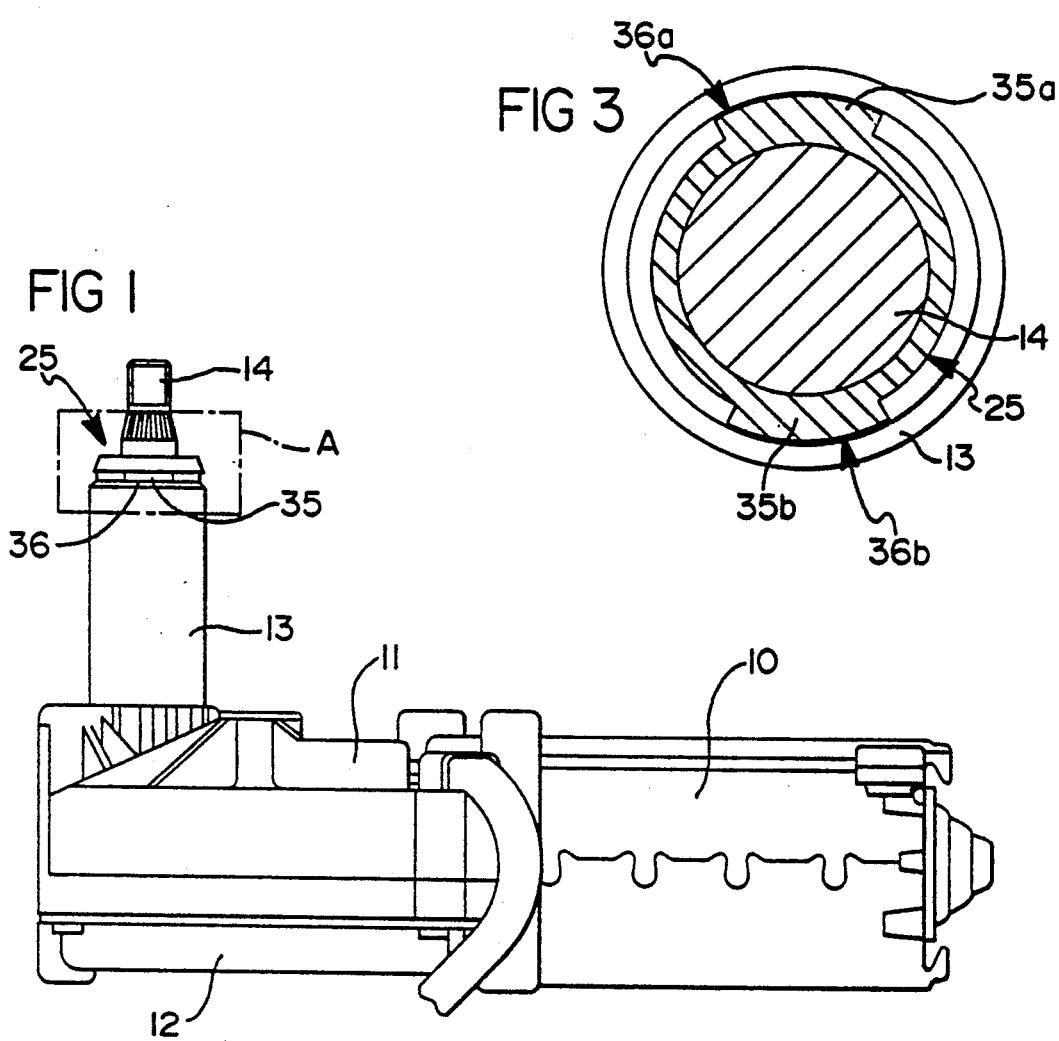
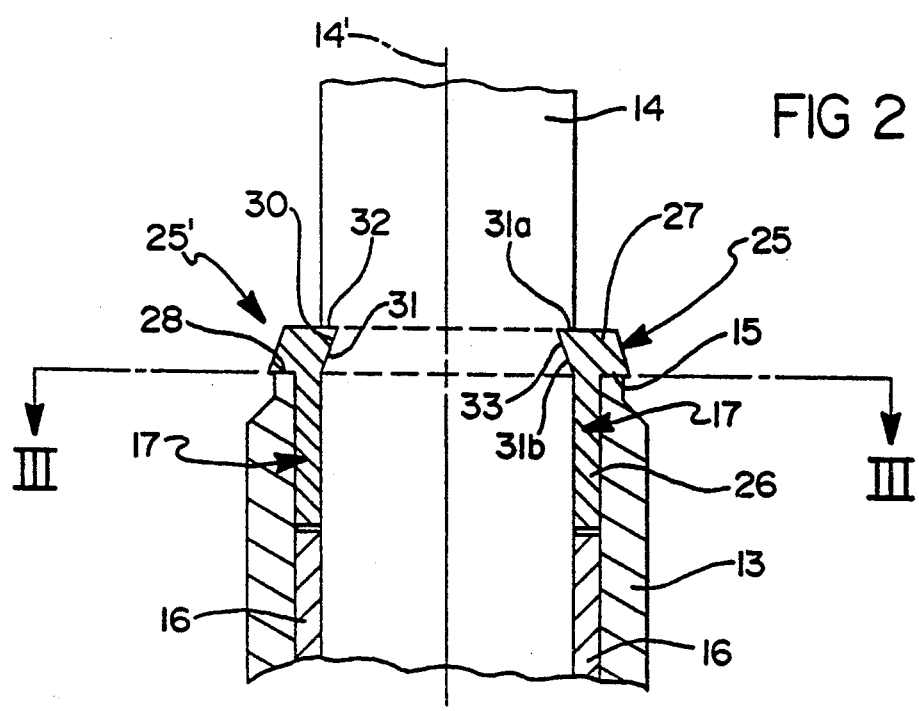

DRIVE DEVICE, ESPECIALLY FOR WIPERS OF MOTOR VEHICLES

INTRODUCTION

The present invention relates to a driven device, especially for wipers of motor vehicles, with a shaft extending a front face of a bearing housing of the drive device and with a cylindrical slide bearing which is inserted into the bearing housing at a little distance from the front face of said bearing housing, and with a ring groove limited by the slide bearing, the bearing housing and the shaft.

BACKGROUND OF THE INVENTION

Such a drive device is known from serial usage in motor vehicles. In this known drive device the bearing housing is part of a gear housing flanged onto an electric motor. The shaft extending the front face of the bearing housing and driven rotatingly or in pendulum motion by the electric motor via gear members located in the gear housing serves as a wiper shaft carrying a wiper arm with a wiper blade. The slide bearing is pushed into the bearing housing up to a stop to such an extent that its distance from the front face of the bearing housing is only little. A disadvantage of the known drive device is that it requires a complicated sealing of the ring groove between the bearing housing and the shaft; for in the known drive device it is provided that a sealing ring is inserted into the ring groove between the shaft and the bearing housing. In order to prevent the sealing ring from getting out of the ring groove, a securing ring engaging into a groove of the shaft is necessary. The sealing of the ring groove between the wiper shaft and the bearing housing, which sealing is achieved by the sealing ring and the securing ring inserted into the ring groove causes relatively high manufacturing costs due to its two-part embodiment. Furthermore, it is difficult to assemble the known sealing concerning the ring groove of such a drive device because it is always difficult and not easily automated to adjust the securing ring in perpendicular direction to the axis of the shaft.

BRIEF DESCRIPTION OF THE INVENTION

In order to avoid these disadvantages the object of the invention is to develop a drive device of the kind mentioned at the beginning in such a way that a simple sealing which can easily and at low costs be realized is obtained.

This object is achieved according to the invention by way of a bush firmly fixed onto the bearing housing and made of elastic material, which bush closes the ring groove between the bearing housing and the wiper shaft and comprises a radially projecting sealing flange at its end turned off from the bearing housing, which sealing flange engages into a ring groove of the shaft.

By these measures according to the invention the ring groove between the shaft and the bearing housing of the drive device is sealed in an especially simple manner: The bush according to the invention fulfills—in an especially advantageous manner—both the function of the sealing ring and the securing ring of the known drive device. The advantage of the integral embodiment of the sealing according to the invention is that this embodiment can be manufactured at considerably lower costs and mounted in a simpler way than a two-part sealing consisting of a sealing ring and a securing ring.

The assembly of the bush according to the invention in the ring groove can especially simply be automated because said assembly can especially simple be carried out by axially pushing the bush onto the shaft and pressing it into the bearing housing. Thus it is of an advantage that the sealing ring need not be adjusted in an awkward manner. The sealing flange which is provided at the end of the bush according to the invention turned off from the bearing housing and radially projecting towards the inside prevents—in a secure and reliable way also in this area—in cooperation with the ring groove of the shaft moisture from entering the bearing housing, what would be of a disadvantage. A further effect of the sealing flange of the bush according to the invention, which sealing flange engages into the ring groove is that the bush is prevented from axially shifting on the shaft.

In a preferred embodiment of the invention it is provided that the bush can be pushed into the ring groove and comprises a ring flange which laps over the front fact of the bearing housing and is radially directed towards the outside. Thereby the external dimension of a cylindrical body of the bush entering the ring groove is adapted to the internal dimension of the bearing housing in such a way that the bush, when being mounted, is firmly connected with the bearing housing. These measures according to the invention make sure that both the ring groove is reliably sealed and the bush is firmly fixed in the bearing housing in an especially simple manner.

An advantageous development of the invention provides that the bush according to the invention comprises—at its front end—at least one projection axially running and directed towards the bearing housing, which projection engages into a recess respectively formed on the front face of the bearing housing. Thus it is achieved according to the invention that the bush is connected with the bearing housing in a way that is especially highly protected against rotation.

Advantageous developments of the invention can be gathered from the subclaims.

BRIEF DESCRIPTION OF THE DRAWINGS

Further details of the invention can be seen in the embodiment which is described by way of the figures in which, FIG. 1, is an embodiment of the drive device;

FIG. 2, is a longitudinal section of the area A of FIG. 1; and

FIG. 3, is a section taken along the line III—III of FIG. 2.

DETAILED DESCRIPTION OF THE PREFERRED EMBODIMENT OF THE INVENTION

The drive device illustrated in FIG. 1 comprises a motor housing 10 in which substantially the stationary and rotating electric member of an electric motor (not illustrated) are located. A pot-like gear housing 11 is flanged onto the motor housing 10, which gear housing 11 is closed by a lid 12. A bearing housing 13 is fixed onto the side of the gear housing 11 opposite the lid 12, in which gear housing 13 a wiper shaft 14 is rotatably mounted. The wiper shaft 14 extending the front side 15 of the bearing housing 13 turned off from the gear housing 11 is driven in a rotating manner or in pendulum motion by the electric motor via gear members located in the gear housing 11. For mounting the wiper shaft 14 into the bearing housing 13, two cylindrical slide bearings 16 (see FIG. 2) are pressed into said gear housing 13 from opposite directions up to a shoulder each. This pressure is so strong that the slide gearings 16 cannot be rotated with respect to the bearing housing 13. The two shoulders within the bearing housing 13 are distanced from each other to a certain extent so that the two slide bearings 16 are of a certain distance from each other. A ring groove 17 provided on the front side 15 of the bearing housing 13 is limited in axial direction by the upper slide bearing 16 of the two slide bearings pressed into the bearing housing 13 illustrated in FIG. 2, which ring groove 17 is formed by the gap between the wiper shaft 14 and the bearing housing 13.

The way a bush 25 is formed, which bush 25 is made of an elastic rubber element and serves for sealing the ring groove 17, is of special importance. The bush 25 substantially consists of a hollow cylindrical body 26 which firmly can be pushed into the ring groove 17. The outer dimension of the hollow cylindrical body 26 of the bush 25 is adapted to the inner dimension of the bearing housing 13 in such a way that the bush 25 can be pressed into the bearing housing 13, but is firmly fixed after the assembly with respect to the bearing housing 13. Thereby the inner diameter of the hollow cylindrical body 26 of the bush 25 is determined in such a way that its inner surface lies on the outer surface of the wiper shaft 14. At an upper end 25' of the bush 25 turned off from the bearing housing 13 the hollow cylindrical body 26 integrally changes into a ring flange 27 radially projecting towards the outside, which ring flange 27 laps over the front face 15 of the bearing housing 13. An outer shoulder 28 of the ring flange 27 lies on the front face 15 of the bearing housing 13 and thus limits the way of the bush 25 into the ring groove 17 between the bearing housing 13 and the wiper shaft 14.

The upper area of the ring flange 27 turned off from the bearing housing 13 integrally changes into a sealing flange 30 radially directed towards the inside, which sealing flange 30 engages into a ring groove 31 of the wiper shaft 14, which ring groove 31 is of a saw-tooth-like cross-section. The bush 25 being assembled, an upper surface 32 of the broader ring flange 30 lies on a first side 31a of the groove 31 orthogonally running with respect to the axis 14' of the wiper shaft 14 and thus seals the ring groove 17 in the area of the wiper shaft 14. An inner surface 33 of the sealing flange 30 is pushed against a second side 31b of the ring groove 31 of the wiper shaft 14. By means of the sealing flange 30 and the ring groove 31 of the wiper shaft 14 cooperating with said flange 30 a sealing is given in an especially advantageous manner, so that the ring groove 17 is securely and reliably sealed also in the area of the wiper shaft 14. Besides, the bush 25 is supported in axial direction by the sealing flange 39 engaging into the ring groove 31 of the wiper shaft 14 so that the bush 25 is prevented from involuntarily being shifted in axial direction.

The firm and non-rotatable hold of the bush 25 on the bearing housing 13 by adapting the outer dimension of the bush 25 to the inner dimension of the bearing housing 13 is normally sufficient. An advantageous development of the bush 25 which is characterized by an especially great protection against rotation with respect to the wiper shaft 14 is described in the following:

As it can be seen best in FIG. 3 as well as in FIG. 1, the bush 25 on the ring flange 27 comprises two projections 35 axially directed towards the bottom, i.e. towards the bearing housing 13, which projections 35 engage into recesses 36 respectively formed in the front face 15 of the bearing housing 13. These projections 35 and the recesses 36 improve the protection against rotation of the bush 25 in the bearing housing 13 in an advantageous manner. The first and second recess 36a and 36b illustrated in FIG. 3 are diametrically located to each other and range over an angle area of about 60°. The diametrical arrangement of the projections 35a and 35b cooperating with the recesses 36a and 36b as well as the angle area occupied by them are only of exemplary character. It is also possible to provide either only one or more than two recesses 36 in the front face 15 of the bearing housing 13 as well as a respective number of axial projections 35 of the ring flange 27 cooperating with these recesses 36. It is clear to the skilled artisan what the number and the angle area of the recesses 36 in the front face 15 of the bearing housing must be like as well as the projections 35 of the ring flange 27 cooperating with said recesses 36 must be like in order to adapt the bush 25 with respect to its protection against rotation to the desired purpose of usage.

What is claimed is:

1. A drive device comprising a shaft extending a front face of a bearing housing; a cylindrical slide bearing disposed within the bearing housing axially spaced from the front face; a ring groove positionally fixed by the slide bearing, the bearing housing and the shaft; and a bush fixed to the bearing housing and made of elastic material, which bush closes the ring groove in front of the slide bearing and, at its end turned off from the bearing housing, comprises a radially inwardly projecting sealing flange sealingly engaging a ring groove defined by the shaft.

2. A drive device according to claim 1, wherein the bush comprises a section axially displacable into the ring groove and a radially outwardly directed ring flange lapping over the front face of the bearing housing.

3. A drive device according to claim 2, wherein the outer dimension of the cylindrical section of the bush axially displacable into the ring groove is adapted to the inner dimension of the bearing housing whereby the bush, when mounted, is firmly arrested in the bearing housing.

4. A drive device according to claim 3, wherein an inner side of the cylindrical section of the bush is disposed adjacent the shaft.

5. A drive device according to claim 2, wherein the bush lies on the front face of the bearing housing by way of an outer shoulder of the ring flange.

6. A drive device according to claim 2, wherein the bush comprises at least one projection axially running and directed towards the bearing housing, which projection engages into a recess respectively formed in the front face of the bearing housing.

7. A drive device according to claim 6, wherein two projections of the bush are diametrically arranged to each other and engage into recesses of the bearing housing diametrically arranged to each other.

8. A drive device according to claim 6, wherein characteristic angle area of the recesses of the bearing housing and angle area of the projections axially running of the bush range over 60°.

9. A drive device according to claim 1, wherein the bush is made of rubber elastic material.

10. A motor vehicle wiper drive device comprising:

a bearing housing defining a bore exiting through a front housing face;

a sleeve bearing press fit within said bore axially spaced from said front face;

a shaft extending from said front face and supported for rotation within said bore by said bearing, said shaft defining an annular ring groove adjacent said face; and an elastic bush comprising a cylindrical body press fit within said bore and axially extending between said face and bearing, said bush further comprising a radially inwardly directed flange sealingly engaging said ring groove.

11. The drive device according to claim 10, wherein said bush further defines a radially outwardly extending circumferentail shoulder axially abutting said face.

12. The drive device according to claim 10, further comprising means operative to positively interlock said bush and housing to ensure against relative rotation therebetween.

* * * * *